(12) United States Patent
Pettersson

(10) Patent No.: US 7,895,761 B2
(45) Date of Patent: Mar. 1, 2011

(54) MEASUREMENT METHOD AND MEASURING DEVICE FOR USE IN MEASUREMENT SYSTEMS

(75) Inventor: Bo Pettersson, London (GB)

(73) Assignee: Hexagon Metrology AB, Nacka Strand (SE)

( * ) Notice: Subject to any disclaimer, the term of this patent is extended or adjusted under 35 U.S.C. 154(b) by 0 days.

(21) Appl. No.: 11/995,822

(22) PCT Filed: Aug. 3, 2006

(86) PCT No.: PCT/SE2006/050276

§ 371 (c)(1),
(2), (4) Date: Jan. 16, 2008

(87) PCT Pub. No.: WO2007/015677

PCT Pub. Date: Feb. 8, 2007

(65) Prior Publication Data

US 2008/0196260 A1 Aug. 21, 2008

(30) Foreign Application Priority Data

Aug. 4, 2005 (SE) .................................... 0501777

(51) Int. Cl.
*G01B 5/004* (2006.01)
(52) U.S. Cl. .......................................... 33/503; 33/556
(58) Field of Classification Search .................... 33/1 M, 33/502, 503, 556, 557, 558, 559, 560, 561; 702/94, 95, 151, 152, 153, 168
See application file for complete search history.

(56) References Cited

U.S. PATENT DOCUMENTS

| 5,834,623 | A | * | 11/1998 | Ignagni | 702/105 |
| 6,061,021 | A | | 5/2000 | Zibell | 342/418 |
| 6,611,141 | B1 | * | 8/2003 | Schulz et al. | 324/226 |
| 6,868,356 | B2 | * | 3/2005 | Nai et al. | 702/95 |
| 7,310,889 | B2 | * | 12/2007 | Stamenkovic | 33/503 |
| 7,318,001 | B2 | * | 1/2008 | Clark | 702/94 |
| 2003/0079358 | A1 | * | 5/2003 | Nai et al. | 33/503 |

FOREIGN PATENT DOCUMENTS

| GB | 2 045 938 A | 11/1980 |
| JP | 9-257461 A | 10/1997 |
| WO | 2004/033991 A1 | 4/2004 |

OTHER PUBLICATIONS

Machine translation of WO 2004/033991 A1, performed Jun. 16, 2009, pp. 1-5.*

* cited by examiner

*Primary Examiner*—Amy Cohen Johnson
(74) *Attorney, Agent, or Firm*—Young & Thompson

(57) ABSTRACT

A measurement method and a measuring device for use in measurement systems such as co-ordinate measurement machines and similar, where a position sensor is arranged to register its position in order to determine the form and dimensions of an object. The position sensor is supported by a support, the position and orientation of which are determined through calculation with the aid of data from at least one of accelerometers, GPS receivers and gyroscopes, and based on a known starting position.

11 Claims, 1 Drawing Sheet

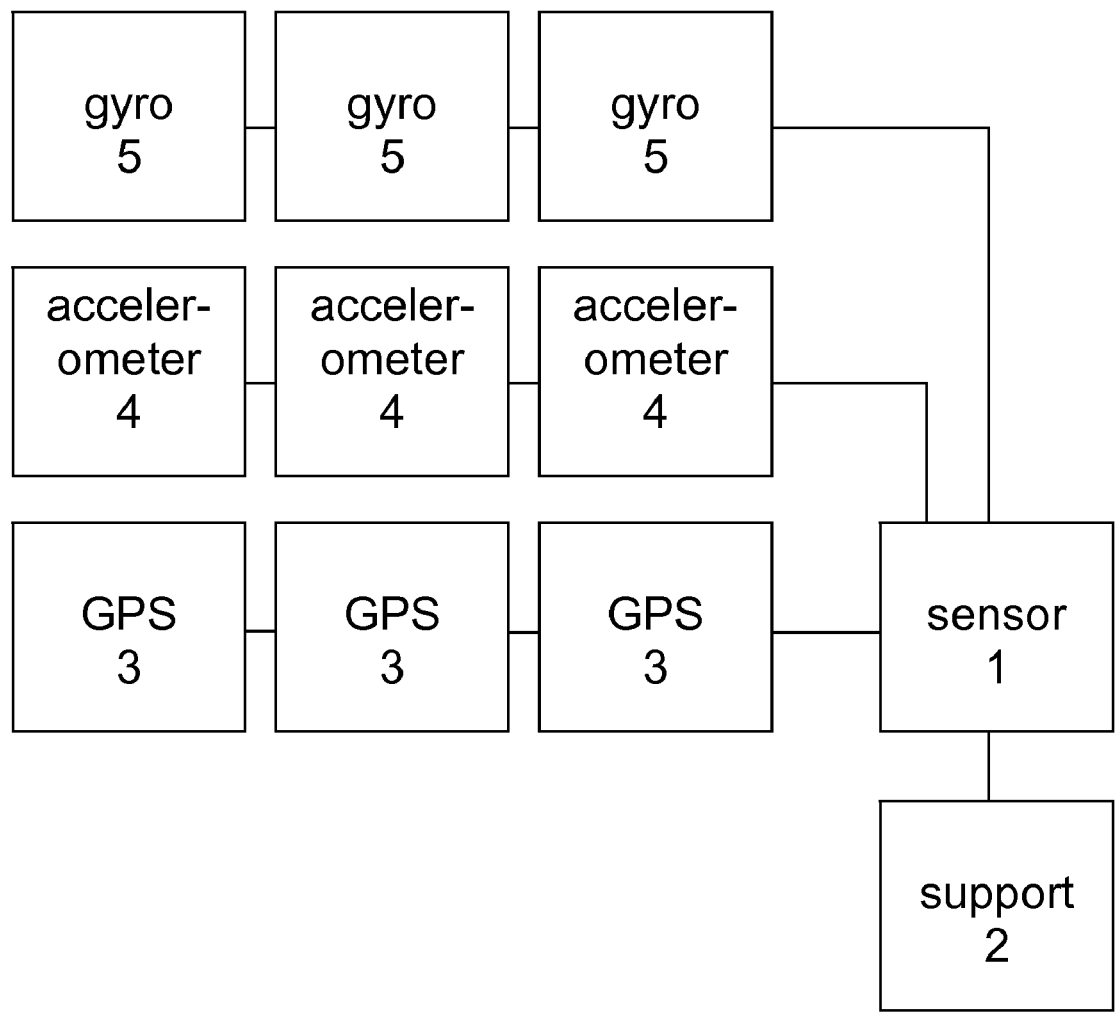
Figure

MEASUREMENT METHOD AND MEASURING DEVICE FOR USE IN MEASUREMENT SYSTEMS

BACKGROUND OF THE INVENTION

The present invention concerns a measurement method and a measuring device for use in measurement systems such as co-ordinate measurement machines and similar, where a position sensor is arranged to register its position in order to determine the form and dimensions of an object.

DETAILED DESCRIPTION OF THE INVENTION

A probe, contact or non-contact, of some form is normally used in measurement systems, and a support is arranged that supports and displaces the probe. The aim of the support is to displace the probe to a correct location such that it is able to register relevant data, i.e. the data that are required in order to be able to carry out the measurement task. Examples of such supports are co-ordinate measurement machines, supports known as "articulated arms", laser trackers, photogrammetry systems, etc.

One disadvantage of co-ordinate measurement machines and the supports known as articulated arms is that a number of mechanical elements and couplings are included in the system that supports the probe, and it is most often necessary to displace not only the probe, but also the mechanical elements and couplings in order to be able to capture the measurement data required.

One disadvantage of the laser trackers and photogrammetry systems is that they require a clear line of sight from the object that is to be measured to the probe, and this may create problems, particularly if the measurement location is inside an object, for example, inside a car.

SUMMARY OF THE INVENTION

It is therefore one aim of the present invention to achieve a new measurement method and a new measuring device with which the problems of known measurement systems described above can be eliminated.

The above aim of the invention for the achievement of a new measurement method is achieved according to the invention with a measurement method in which the position sensor is supported by a support, the position and orientation of which are determined by calculation with the aid of data from at least one of accelerometers, GPS receivers and gyroscopes, and based on a known starting position.

The above aim of the invention for the achievement of a new measuring device is achieved according to the invention with a measurement arrangement in which the position sensor is supported by a support the position and orientation of which are arranged to be determined by calculation with the aid of data from at least one of accelerometers, GPS receivers and gyroscopes, and that is based on a known starting position.

BRIEF DESCRIPTION OF THE DRAWING

The sole drawing figure schematically illustrates the invention.

DETAILED DESCRIPTION OF THE PREFERRED EMBODIMENTS

By using at least one of accelerometers, GPS receivers (3) and gyroscopes connected to the support and by calculating the displacement and any rotation based on the known starting position, it is possible to calculate each position for the position sensor (1) or probe that is supported by the support (2). It is appropriate to use three accelerometers (4) and three gyroscopes (5), by which configuration it is possible to calculate the position of the support with six degrees of freedom, position and orientation.

It is possible also to use solely accelerometers, and by suitable placement of these it is, despite everything, possible to register also the orientation with the aid of the accelerometers, and it will in this manner be possible to determine the exact position.

It is possible also to use a GPS receiver in combination with accelerometers or gyroscopes, or to use three GPS receivers, which gives both position and orientation.

The measuring device according to the invention can be used in, for example, a measurement system in which an independent unit can be operated in a wireless manner. The measuring device can be mounted in a robot, and it is then fully independent of the operation and control of the robot, such that the precision of the measuring device is fully independent of the positional accuracy of the robot.

A measurement system that exploits the measuring device according to the invention is, essentially, a relative measurement system, but through the arrangement of one or several known reference points, the measurement system can operate and display its measurement result in absolute co-ordinates.

The calculation of the current position of the probe normally takes place through the method of double integration based on data from the accelerometers or gyroscopes.

The probe that is used in the measuring device according to the invention may be of any suitable type, such as, for example, a conventional contact probe or a contact-free probe, such as, for example, a laser scanner.

The invention claimed is:

1. A measurement method for use in measurement systems, comprising the step of:
   determining a form and dimensions of an object by registering a position sensor on a support, and plural substeps of
   i) calculating a position of the support from data obtained by making a position measurement with a GPS receiver connected to the support and using a known starting position of the support, and
   ii) calculating an orientation of the support from data obtained by making a measurement with at least one of an accelerometer and a gyroscope connected to the support and using a known starting orientation of the support.

2. The measurement method according to claim 1, wherein the calculations of the position and the orientation of the support are determined through calculation of a displacement and any rotation of the support with six degrees of freedom.

3. The measurement method according to claim 1, wherein the calculation of the orientation includes double integration of data from the at least one of an accelerometer and a gyroscope connected to the support.

4. The measurement method according to claim 1, wherein the calculation of the orientation of the support is based on data from three accelerometers and three gyroscopes.

5. The measurement method according to claim 1, wherein three GPS receivers are used in the calculation of position.

6. The measurement method according to claim 1, wherein the orientation calculation is based solely on data from accelerometers.

7. A measuring device for use in measurement systems, comprising:

a support;

a position sensor supported by the support;

a GPS receiver connected to the support; and at least one of accelerometers and gyroscopes connected to the support, wherein, the GPS receiver provides measurement data of a position of the support, the at least one of accelerometers and gyroscopes provide measurement data of an orientation of the support, and a form and dimensions of an object are determined based on a known starting position of the support and calculations of position and orientation of the support determined from the measurement data of the GPS receiver and the at least one of accelerometers and gyroscopes.

8. The measuring device according to claim 7, wherein the measuring device comprises three accelerometers and three gyroscopes.

9. The measuring device according to claim 7, wherein the position sensor is a probe.

10. The measuring device according to claim 7, wherein three GPS receivers are arranged on the support for the calculation of position.

11. The measuring device according to claim 7, wherein the measuring device comprises solely accelerometers in order to provide data for the calculation of the orientation of the position sensor.

* * * * *